United States Patent
Jones et al.

(10) Patent No.: US 8,725,987 B2
(45) Date of Patent: May 13, 2014

(54) CACHE MEMORY SYSTEM INCLUDING SELECTIVELY ACCESSIBLE PRE-FETCH MEMORY FOR PRE-FETCH OF VARIABLE SIZE DATA

(75) Inventors: Andrew Michael Jones, Bristol (GB); Stuart Ryan, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 1049 days.

(21) Appl. No.: 12/284,329

(22) Filed: Sep. 19, 2008

(65) Prior Publication Data
US 2009/0132749 A1     May 21, 2009

(30) Foreign Application Priority Data
Nov. 19, 2007 (GB) .................................. 0722707.7

(51) Int. Cl.
| | | |
|---|---|---|
| G06F 12/00 | (2006.01) | |
| G06F 9/26 | (2006.01) | |
| G06F 9/34 | (2006.01) | |
| G06F 13/00 | (2006.01) | |
| G06F 13/28 | (2006.01) | |

(52) U.S. Cl.
USPC ..... 711/213; 711/118; 711/204; 711/E12.002

(58) Field of Classification Search
None
See application file for complete search history.

(56) References Cited

U.S. PATENT DOCUMENTS

| | | | |
|---|---|---|---|
| 5,361,391 A * | 11/1994 | Westberg ...................... | 711/137 |
| 5,713,003 A | 1/1998 | DeWitt et al. | |
| 5,761,706 A | 6/1998 | Kessler et al. | |
| 5,944,815 A | 8/1999 | Witt | |
| 5,956,744 A | 9/1999 | Robertson et al. | |
| 5,983,324 A | 11/1999 | Ukai et al. | |
| 6,173,392 B1 * | 1/2001 | Shinozaki ...................... | 712/207 |
| 6,643,743 B1 | 11/2003 | Hum et al. | |
| 6,697,909 B1 | 2/2004 | Wang et al. | |
| 6,738,867 B1 * | 5/2004 | Kanai ........................... | 711/137 |
| 6,792,508 B1 * | 9/2004 | Chauvel et al. ............... | 711/128 |
| 6,862,657 B1 | 3/2005 | Grimsrud et al. | |
| 7,177,985 B1 * | 2/2007 | Diefendorff ................... | 711/137 |
| 7,512,740 B2 * | 3/2009 | Diefendorff ................... | 711/137 |
| 2001/0011330 A1 | 8/2001 | Hughes et al. | |
| 2002/0087801 A1 * | 7/2002 | Bogin et al. ................... | 711/137 |

(Continued)

FOREIGN PATENT DOCUMENTS

| | | |
|---|---|---|
| EP | 1 111 511 A1 | 6/2001 |
| JP | 2000-353146 | 12/2000 |
| JP | 2003-242027 | 8/2003 |
| WO | WO 2008/085647 A1 | 7/2008 |

OTHER PUBLICATIONS

Office Action dated Aug. 19, 2011 in connection with U.S. Appl. No. 12/284,336.

(Continued)

*Primary Examiner* — Edward Dudek, Jr.
*Assistant Examiner* — Matthew Chrzanowski
(74) *Attorney, Agent, or Firm* — Munck Wilson Mandala, LLP

(57) ABSTRACT

Systems and methods are disclosed for pre-fetching data into a cache memory system. These systems and methods comprise retrieving a portion of data from a system memory and storing a copy of the retrieved portion of data in a cache memory. These systems and methods further comprise monitoring data that has been placed into pre-fetch memory.

27 Claims, 8 Drawing Sheets

(56) References Cited

U.S. PATENT DOCUMENTS

| | | |
|---|---|---|
| 2002/0116584 A1 | 8/2002 | Wilkerson |
| 2003/0191900 A1* | 10/2003 | Hooker .................. 711/137 |
| 2004/0064648 A1 | 4/2004 | Brown et al. |
| 2004/0148473 A1 | 7/2004 | Hughes et al. |
| 2004/0199727 A1 | 10/2004 | Narad |
| 2004/0205300 A1 | 10/2004 | Bearden |
| 2005/0125644 A1 | 6/2005 | Barry et al. |
| 2005/0216666 A1* | 9/2005 | Sih et al. ............... 711/118 |
| 2006/0075142 A1* | 4/2006 | Cornett et al. ......... 709/246 |
| 2006/0085602 A1 | 4/2006 | Huggahalli et al. |
| 2006/0112229 A1 | 5/2006 | Moat et al. |
| 2006/0123195 A1 | 6/2006 | Mukherjee |
| 2006/0294322 A1* | 12/2006 | Matsuzaki et al. ..... 711/149 |
| 2007/0043907 A1* | 2/2007 | Diefendorff ............ 711/137 |
| 2007/0067577 A1 | 3/2007 | Henry et al. |
| 2007/0113018 A1 | 5/2007 | Brink et al. |
| 2007/0124736 A1 | 5/2007 | Gabor et al. |
| 2007/0204087 A1 | 8/2007 | Birenbach et al. |
| 2008/0104325 A1 | 5/2008 | Narad et al. |
| 2008/0168191 A1 | 7/2008 | Biran et al. |
| 2008/0183913 A1 | 7/2008 | Ryu et al. |
| 2008/0256328 A1 | 10/2008 | Nagarkar et al. |
| 2008/0263257 A1 | 10/2008 | Cain III et al. |

OTHER PUBLICATIONS

Office Action dated Aug. 11, 2011 in connection with U.S. Appl. No. 12/284,332.
Office Action dated Apr. 18, 2011 in connection with U.S. Appl. No. 12/284,331.
Anoop Gupta, et al., "Comparative Evaluation of Latency Reducing and Tolerating Techniques", 1991 ACM, p. 254-263.
Search Report dated Jan. 29, 2009 in connection with United Kingdom Patent Application No. GB0821079.1.
Search Report dated Feb. 3, 2009 in connection with United Kingdom Patent Application No. GB0821080.9.
Search Report dated Jan. 26, 2009 in connection with United Kingdom Patent Application No. GB0821078.3.
Search Report dated Feb. 9, 2009 in connection with United Kingdom Patent Application No. GB0821081.7,.
Office Action dated Mar. 7, 2012 in connection with U.S. Appl. No. 12/284,332.
Office Action dated Jul. 25, 2012 in connection with U.S. Appl. No. 12/284,336.

* cited by examiner

CACHE MEMORY SYSTEM INCLUDING SELECTIVELY ACCESSIBLE PRE-FETCH MEMORY FOR PRE-FETCH OF VARIABLE SIZE DATA

CROSS-REFERENCE TO RELATED APPLICATIONS

The present application is related to United Kingdom Patent Application No. 0722707.7, filed Nov. 19, 2007, entitled "CACHE MEMORY SYSTEM". United Kingdom Patent Application No. 0722707.7 is assigned to the assignee of the present application and is hereby incorporated by reference into the present disclosure as if fully set forth herein. The present application hereby claims priority under 35 U.S.C. §119(a) to United Kingdom Patent Application No. 0722707.7.

TECHNICAL FIELD

The present invention relates to systems comprising cache memories, and in particular to systems employing data pre-fetching.

BACKGROUND

A very large number of systems involve the retrieval of data from a system memory by a device such as a processor. Many of these systems employ a technique known as data caching which exploits a property of data access known as temporal locality. Temporal locality means data that has been accessed recently is the data most likely to be accessed again in the near future. Data caching involves storing, or caching, a copy of recently accessed data in a cache memory that is accessible more quickly and efficiently than the system memory. If the same data is requested again in the future, the cached copy of the data can be retrieved from the cache memory rather than retrieving the original data from the system memory. As the cache memory can be accessed more quickly than the system memory, this scheme generally increases the overall speed of data retrieval.

To implement caching techniques, processor circuitry typically includes an internal cache memory which is located physically closer to the CPU than the system memory, so can be accessed more quickly than the system memory. When the processor requests data from the system memory a copy of the retrieved data is stored in the cache memory, if it is not stored there already. Some systems provide two or more caches arranged between the CPU and the system memory in a hierarchical structure. Caches further up the hierarchy are typically smaller in size, but can be accessed more quickly by the CPU than caches lower down the hierarchy. Caches within such a structure are usually referred to as level 1 (L1), level 2 (L2), level 3 (L3), . . . caches with the L1 cache usually being the smallest and fastest.

A typical cache memory comprises a series of cache lines, each storing a predetermined sized portion of data. For example, a typical cache memory is divided into 1024 cache lines, each 32 bytes in size, giving a total capacity of 32 kB. Data is usually cached in portions equal to the size of a whole number of cache lines. When an item of data smaller than a cache line is cached, a block of data equal to the size of one or more cache lines containing the data item is cached. For example, the data item may be located at the beginning of the cache line sized portion of data, at the end or somewhere in the middle. Such an approach can improve the efficiency of data accesses exploiting a principle known as spatial locality.

The principle of spatial locality means that addresses referenced by programs in a short space of time are likely to span a relatively small portion of the entire address space. By caching one or more entire cache lines, not only is the requested data item cached, but also data located nearby, which, by the principle of spatial locality is more likely to be required in the near future than other data.

Each cache line of the cache memory is associated with address information, known as tags, identifying the region of the system memory from which the data stored in each cache line was retrieved. For example, the tag associated with a particular cache line may comprise the address of the system memory from which the cache line sized portion of data stored in that cache line was retrieved. The cache lines may be stored in a data memory portion of the cache, while the tags may be stored in a tag memory portion of the cache.

When a processor requests data from the system memory, the address of the requested data is first compared to the address information in the tag memory to determine whether a copy of the requested data is already located in the cache as the result of a previous data access. If so, a cache hit occurs and the copy of the data is retrieved from the cache. If not, a cache miss occurs, in which case the data is retrieved from the system memory. In addition, a copy of the retrieved data may be stored in the cache in one or more selected cache lines and the associated tags updated accordingly. In a system comprising a cache hierarchy, when data is requested from the system memory, the highest level cache is first checked to determine if a copy of the data is located there. If not, then the next highest level cache is checked, and so on, until the lowest level cache has been checked. If the data is not located in any of the caches then the data is retrieved from the system memory. A copy of the retrieved data may be stored in any of the caches in the hierarchy.

When applying caching techniques, it is important to ensure that the data stored in a cache represents a true copy of the corresponding data stored in the system memory. This requirement may be referred to as maintaining coherency between the data stored in the system memory and the data stored in the cache. Data coherency may be destroyed, for example, if data in one of the system memory and cache is modified or replaced without modifying or replacing the corresponding data in the other. For example, when the processor wishes to modify data, a copy of which is stored in the cache, the processor will typically modify the cached copy without modifying the original data stored in the system memory. This is because it is the cached copy of the data that the processor would retrieve in future accesses and so, for efficiency reasons, the original data stored in the system memory is not modified. However, without taking steps to maintain coherency, any other devices which access the data from the system memory would access the unmodified, and therefore out of date, data.

Various techniques may be applied to maintain data coherency in cache memory systems. For example, one process, referred to as write-back or copy-back, involves writing or copying data stored in one or more cache lines back to the region of system memory from which the cache lines were originally retrieved (as specified in the address information). This process may be performed in a variety of circumstances. For example, when data stored in a cache line has been modified, the cache line may be copied back to the system memory to ensure that the data stored in the cache line and the corresponding data in the system memory are identical. In another example, when data is copied into the cache as a result of a cache miss, an existing cache line of data may need to be removed to make space for the new entry. This process is known as eviction and the cache line of data that needs to be removed is known as the victim. If the victim comprises modified data, then the victim would need to be written back to the system memory to ensure that the modifications made to the data are not lost when the victim is deleted from the cache.

In some systems, special data coherency routines implemented in software are executed to maintain data coherency. Such routines may periodically sweep the cache to ensure that data coherency is maintained, or may act only when specifically required, for example when data is modified or replaced. These routines may include write-back or copy-back processes.

Some systems employ a technique known as data pre-fetching in which data may be retrieved, possibly speculatively, before it is actually needed in order to increase the overall speed of memory access. Data pre-fetches may be speculative in the sense that the pre-fetched data may not eventually be required. In one example of data pre-fetching, when executing a code loop in which an item of data needs to be retrieved within each iteration of the loop, the data required for a particular iteration may be pre-fetched during the preceding iteration. In this way, at the point the data is actually required, it does not need to be retrieved at that time. In another example, in highly integrated multimedia systems, very large quantities of data are manipulated, typically in a linear fashion, in a technique known as data streaming. In such applications, the future access patterns of data may be known some time in advance. In this case, data required in the future may be pre-fetched so that it is immediately available when eventually required.

Typically, pre-fetched data is stored in a cache and treated as cached data. In this way, when the pre-fetched data is actually requested, the cache will be checked to determine whether the requested data is located there. Due to the earlier data pre-fetch, a copy of the data can be retrieved from the cache, rather than accessing the system memory. Pre-fetching data into a cache is useful even in applications involving data accesses where the property of temporal locality do not apply. For example, in data streaming applications, data may only be used a single time, so temporal locality does not apply in this case. However, for the reasons given above caching pre-fetched data is advantageous.

Many processor architectures provide special pre-fetch instructions which allow software to cause data to be pre-fetched into a cache in advance of its use. Examples of such instructions include pre-fetch, preload or touch instructions. In such cases a cache normally communicate via a special interface which allows the cache to perform actions when a special instruction is executed by the processor. Data may be pre-fetched into any cache present in a cache hierarchy, such as a level 1 cache or level 2 cache. In some systems, pre-fetching data into a level 2 cache may be performed as a consequence of issuing a request to pre-fetch data into the level 1 cache.

A limiting factor in the performance of many systems is the delay between a CPU requesting data from memory and the data actually being supplied to it. This delay is known as memory latency. For example, the memory latency of highly integrated systems is typically 10-100 times the duration of the execution of a single instruction by the CPU. With the continuing development of processors, CPU clock rates are increasing rapidly, resulting in increasing demand for higher rates of data access. Even with improvements in the speed of memory access, the effects of memory latency are becoming more significant as a result.

There is a need, therefore, for a system and method for pre-fetching data which is as fast and efficient as possible. While special pre-fetch instructions are provided in some existing systems, the execution of such instructions may take a significant period of time to complete. This means that data may be pre-fetched only after a significant delay, reducing the overall performance of the system. Furthermore, the use of special instructions to invoke data pre-fetching increases the size of the processor's instruction set resulting in greater complexity.

SUMMARY

The present invention solves these and other problems associated with existing techniques.

According to a first aspect, the present disclosure provides a cache memory system for caching data comprising: a cache memory for storing a copy of a portion of data stored in a system memory; and a cache load circuit capable of retrieving the portion of data from the system memory and of storing a copy of the retrieved portion of data in the cache memory; wherein the system further comprises: a pre-fetch memory for storing a value; and means for monitoring when a value has been written to the pre-fetch memory; the system being arranged such that when the means for monitoring determines that a value has been written to the pre-fetch memory, the cache load circuit retrieves the portion of data stored in the system memory at a memory address defined by the written value, and stores the retrieved portion of data in the cache memory.

According to a second aspect, the present disclosure provides a method for pre-fetching data into a cache memory system, the method comprising the steps of: retrieving a portion of data from a system memory; and storing a copy of the retrieved portion of data in a cache memory; wherein the method comprises the further step of: monitoring when a value has been written to a pre-fetch memory; and when a value has been written to the pre-fetch memory, retrieving the portion of data from the system memory at a memory address defined by the written value, and storing the retrieved portion of data in the cache memory.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
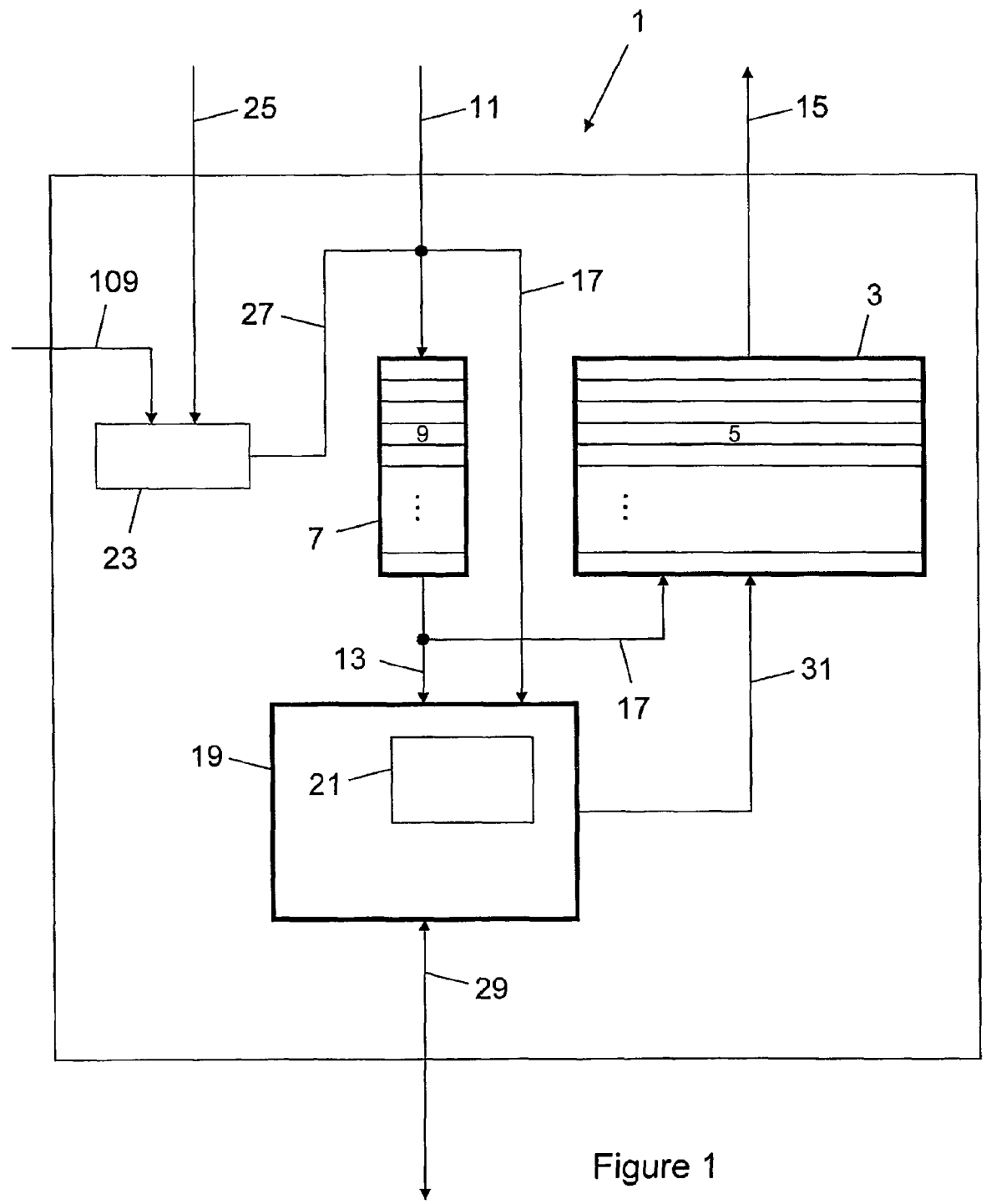
FIG. 1 is a schematic diagram of a cache memory system in a first embodiment of the invention.

FIG. 1 is a schematic diagram of an exemplary cache memory system. The system, referred to below simply as cache 1, comprises a data memory 3 for storing one or more cache lines 5 of data and a tag memory 7 for storing address information in the form of a series of tags 9. For each cache line 5 in the data memory 3, there is a corresponding tag 9 in the tag memory 7. The cache 1 also comprises a cache load circuit 19 used to store data in the data memory 3. It is understood that the disclosed embodiments may be used in a variety of cache systems and is not limited to the arrangement illustrated in FIG. 1.

Figure 2:
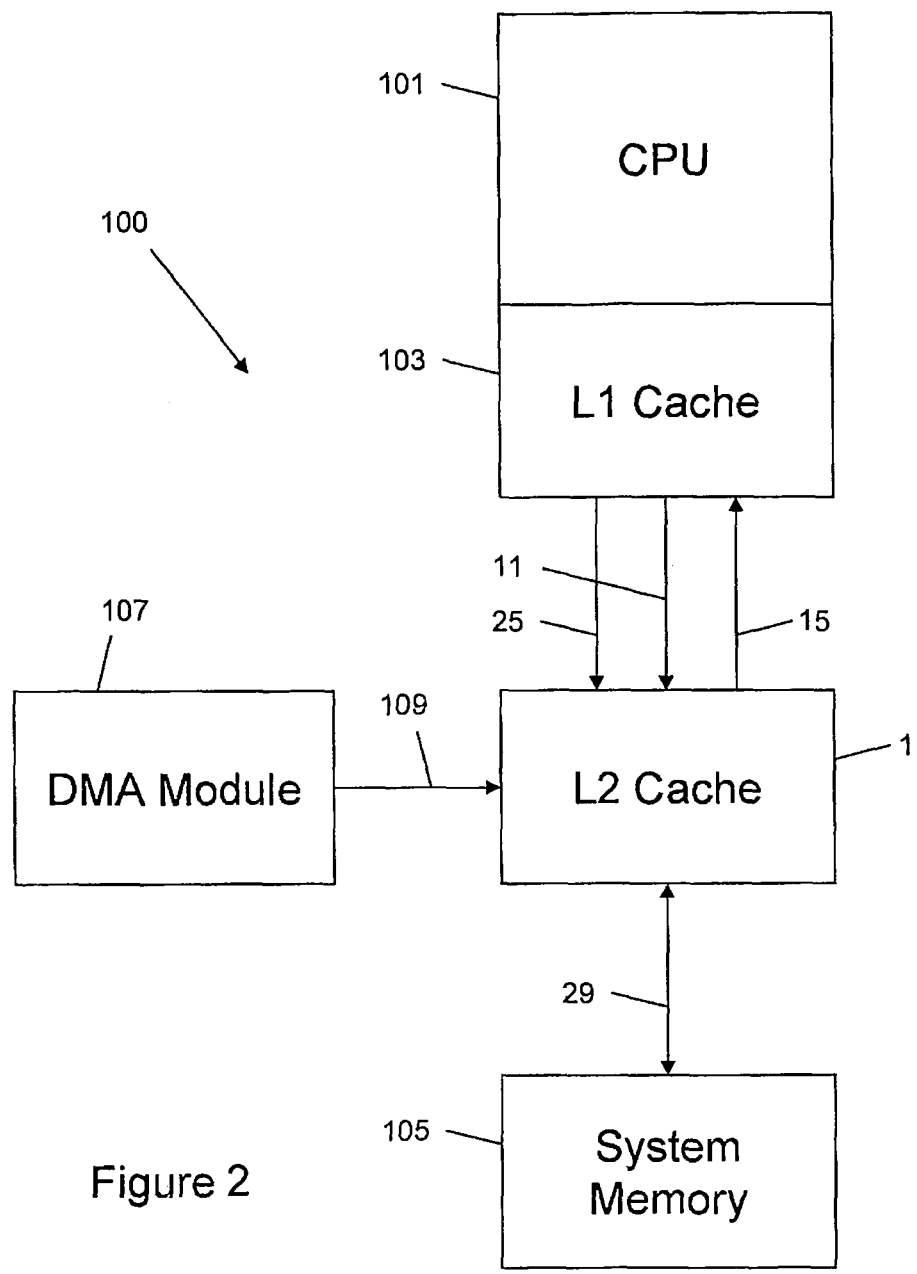
FIG. 2 is a schematic diagram of a system comprising the cache shown in FIG. 1.

FIG. 2 illustrates a system 100 comprising the cache 1 shown in FIG. 1. As shown in FIG. 2, in this embodiment, the cache 1 is a level 2 cache functionally located between a processor 101 comprising a level 1 cache 103 and a system memory 105. However, it is understood that the cache shown in FIG. 1 may be used as any level of cache, in any cache hierarchy arrangement or as a sole cache. The term system memory may refer to a specific memory device or to a group of two or more memory devices. In general the system memory represents a general memory space formed from the whole, or part of, the individual memory spaces of one or more memory devices. The processor 101 directly accesses the level 1 cache 103. The level 1 cache 103 communicates with the level 2 cache 1 via bus lines 11, 15 and 25 and the level 2 cache 1 communicates with the system memory 105 via bus line 29. The system 100 also comprises other modules, including a module 107 having DMA (Direct Memory Access) capability. The module 107 accesses the level 2 cache 1 via bus line 109. Other parts of the system (not shown) may also access the level 2 cache 1 via further bus lines (not shown) which may be separate from or integrated with bus line 109.

With reference to FIG. 2, when the processor 101 issues a request for retrieval of data stored in the system memory 105 the following process occurs. First, the data access request is transmitted to the level 1 cache 103 which determines whether it stores a copy of the requested data. If so then the copy of the requested data is retrieved from the level 1 cache 103 and provided to the processor 101. In this case, no data retrieval involving the level 2 cache 1 or the system memory 105 is made. If the level 1 cache 103 does not store a copy of the requested data then the data access request is forwarded from the level 1 cache 103 to the level 2 cache 1. In this case, the level 2 cache 1 determines whether it stores a copy of the requested data. If so then the copy of the requested data is retrieved from the level 2 cache 1 and provided to the level 1 cache 103, which in turn provides the data to the processor 101. If the level 2 cache 1 does not store a copy of the requested data then the data is retrieved from the system memory 105. In this case, the level 2 cache 1 requests the data from the system memory 105 and provides the retrieved data to the level 1 cache 103, which in turn provides it to the processor 101.

With reference to FIG. 1, the level 2 cache 1 performs the following process when a data access request is received by it. First, a determination is made as to whether a copy of the data specified in the data access request is already present in the data memory 3 of the cache 1. The data access request identifies the address of the system memory 105 at which the requested data is located. The address of the requested data is supplied to the tag memory 7 via line 11 and compared to the tags 9 stored in the tag memory 7. Each tag 9 comprises an address of the system memory 105 from which a corresponding cache line 5 of data was originally retrieved. If the address of the data presently being requested matches an address specified by a tag 9, this indicates that the data memory 3 does contain a copy of the requested data. A match is indicated by asserting a hit signal on line 13, which is received by the data memory 3 and the cache load circuit 19. When the hit signal is asserted, the cache line 5 of data corresponding to the tag 9 causing the hit is retrieved from the data memory 3 and output from the data memory 3 and cache 1 on line 15.

If no match is found between the address of the requested data and any of the tags 9 in the tag memory, the hit signal is not asserted. In this case the requested data is retrieved from the system memory 105 using the cache load circuit 19 in the manner described below. A copy of the data retrieved from the system memory 105 by the cache load circuit is stored in the data memory 3. The data is then output from the data memory 3 and cache 1 on line 15.

The cache load circuit 19 comprises a memory 21 which stores a queue of pending cache load operations. Each cache load operation represents an item of data to be retrieved from the system memory 105 and includes the memory address of the data item. A cache load operation may also contain other relevant information, such as whether the data is required as the result of a pre-fetch or some other type of data access. The address received on line 11 is provided to the cache load circuit 19 via line 17. As mentioned above, the cache load circuit 19 also receives the hit signal via line 13. When the hit signal on line 13 is not asserted, the cache load circuit 19 adds a cache load operation to the queue stored in the memory 21 based on the address received on line 17. The cache load circuit 19 processes each cache load operation in turn, for example in the order in which they were added to the queue. A newly added cache load operation will eventually be processed by the cache load circuit resulting in the data being retrieved from the system memory 105, stored in the data memory 3 and output from the cache 1.

To process a cache load operation, the cache load circuit identifies the address of the data to be cached and issues a suitable data access request on line 29 which is received by the system memory 105. When the requested data is provided back to the cache load circuit, the cache load circuit identifies one or more suitable cache lines in the data memory in which to store the received data. These may comprise currently vacant cache lines. However, if there are insufficient free cache lines, it may be necessary to remove one or more existing cache lines of data to make room for the new data, in which case the write-back process described above may be required. The cache load circuit then transmits a load command to the data memory via line 31 comprising a copy of data to be cached, the system memory address from which the data was retrieved and the cache lines identified to store the data. The copy of the data is then stored in the cache lines specified in the load command and corresponding tags are added to the tag memory based on the address information specified in the load command.

A technique by which the embodiment illustrated in FIGS. 1 and 2 implements pre-fetching of data will now be described. The cache 1 further comprises a memory 23, which in this embodiment is in the form of a 32 bit write-only register. When a value is written to the register 23, this is interpreted by the system as a request to pre-fetch data into the cache. In the embodiments described below, a write to the register 23 is performed by executing a suitable write instruction, which may be, for example, a data write instruction in a processor's existing instruction set. The execution of the write instruction by the processor causes a value to be written to the register, thereby requesting, initiating or causing a pre-fetch of data.

In one embodiment, when a 32 bit value is written to the register 32, a cache line sized portion of data located at an address specified by the written value is pre-fetched and stored in the data memory 3. In this way, a cache line of data may be pre-fetched into the cache 1 using a single 32 bit write operation. In another embodiment, the address written to the register may be modified to be aligned on a cache-line sized boundary by setting the appropriate number of lower order bits of the written value to zero. For example, if a cache line is 32 bytes in size, the five lowest order bits of the value written to the register are set to zero. A cache line sized portion of data is then pre-fetched from this modified address.

In these arrangements, any suitable means for monitoring when a value has been written to the register may be used. For example, a dedicated monitoring means or monitoring component may be provided to monitor write access to the register. Such a means may be implemented in hardware and may be autonomous and independent of other parts of the system.

In this embodiment, a cache line is 32 bytes in size although in alternative embodiments, cache lines of a different size may be provided. In other embodiments the memory 23 may be a type of memory other than a register, may be a size other than 32 bits and may be capable of being read from as well as written to. The register may be capable of being read for debugging purposes, for example. The memory 23 may comprise, for example, a dedicated memory, or may be a reserved or dedicated location or region within a larger memory space. In general, the memory 23 should be an identifiable memory location within the system 100 to which a value may be written.

As shown in FIG. 2, a value may be written to the register 23 by the level 1 cache 103 or processor 101 via line 25. A value may also be written to the register by the module with DMA capability via line 109. Access to the register may be restricted by disabling or blocking signals on either or both of lines 25 and 109. This arrangement allows parts of the system other than the processor to initiate pre-fetches of data. The cache 1 may comprise one or more access ports, each access port providing access to the register 23 by a respective group of one or more system modules. For example, a first access port may provide access to the register exclusively for the level 1 cache 103 or processor 101 while a second access port provides access to the register for other system modules such as the module with DMA capability. This arrangement makes it easier to control access to the register, for example by selectively blocking one or more of the access ports. By allowing multiple modules to access the register, this allows the modules to share a single cache. For example, in a multi-processor-based system, several CPUs may share the same level 2 cache.

When an address value is written to the register, this value (or a modified value as described above) is communicated to the tag memory via line 27 connected to line 11. An address received by the tag memory via line 27 is handled in the same way as an address received on line 11 as described above. For example, when an address is received by the tag memory via line 27, a determination is made as to whether a copy of the data located at that address is already present in the data memory 3. If so, then no further action is taken since the data has already been cached. However, if a copy of the data is not located in the data memory 3 then a cache line of data located at the address is cached in the manner described above. In some embodiments, even if data to be pre-fetched is already stored in the data memory 3, a pre-fetch initiated by writing a value to the register may cause fresh data to be retrieved and stored. This may be advantageous for example if the currently stored data is known to be stale.

When a cache miss occurs, either through a data request initiated on line 11, or when a value is written to the register, this means that the relevant data is not currently located in the data memory. However as the result of a preceding cache miss or data pre-fetch a process may have already been initiated which will eventually cause the data to be retrieved. For example, the data may be specified in one of the entries in the queue of pending cache load operation waiting to be processed by the cache load circuit 19. For this reason, when a cache miss occurs, before a new entry in the cache load operation queue is added, the existing entries are first searched. If an entry in the queue does not exist for the data, a new entry is added as described above. If an entry already exists then a new entry is added, but the new entry is linked to the existing entry using any suitable means. In this way, when the first of the linked entries is processed by fetching the specified data, the other of the linked entries is processed at the same time without requiring the data to be fetched a second time. Both entries are then deleted from the queue.

The arrangement described above provides several advantages. First, a pre-fetch can be initiated using an existing data write operation to write the appropriate value to the register. This means that special pre-fetch instructions may be not necessary. Second, since the pre-fetch mechanism is operated using dedicated hardware which acts independently of the execution state of the processor, delays between initiating a pre-fetch instruction and it's execution are avoided. The autonomous nature of the monitoring means in embodiments pre-fetching of data can be accomplished more quickly than with existing systems. Third, by allowing modules other than the processor and higher level caches to initiate pre-fetches, the other modules can bypass the normal mechanism needed to request pre-fetches via the processor. This speeds up data pre-fetching for many parts of the system, such as DMA engines. By providing separate routes of access to the register, access to the register by any part of the system can be selectively enabled or disabled according to factors such as security.

In the embodiment described above, writing a value to the register causes a single cache line of data to be pre-fetched from the address represented by the value. In alternative embodiments, writing a value to the register causes a specified number of cache lines of data to be pre-fetched. The specified number may be fixed or variable and may be specified within the system by any suitable parameter or other means which may be written or stored. In one embodiment, when a 32 bit value is written to the register, bits 31:5 of the written value specify bits 31:5 of the address of the data to be pre-fetched. The remaining bits 4:0 of the address are implicitly taken to be zero. In this case, since the five lowest order bits of addresses are always zero, the addresses are ones which are naturally aligned to $2^5=32$ byte boundaries, which in this embodiment is the size of an individual cache line. Bits 4:0 of the value written to the register are interpreted as a binary number specifying the number of cache lines to be pre-fetched, starting with the cache line located at the address defined by bits 31:5 of the written value. This allows a maximum of $2^5-1=31$ cache lines to be pre-fetched, each cache line being aligned on a cache line sized boundary.

In this embodiment, when a value is written to the register, the value represented by bits 4:0 of the written value, referred to below as counter value, is determined. If the counter value is equal to zero then no action is taken. However, if the counter value is non-zero then the address defined by bits 31:5 of the written value (and having bits 4:0 equal to zero) is transmitted to the tag memory on line 27. This initiates a pre-fetch of a single cache line at the defined address in a manner described above. Next, the counter value in bits 4:0 of the register is decremented by 1 and the address in bits 31:5 of the register is incremented by 1. A further pre-fetch is then initiated as before by transmitting the address defined by bits 31:5 of the value written to the register to the tag memory. This address is 32 bytes higher than the previous address and the cache line of data pre-fetched as a result immediately follows the previously pre-fetched cache line of data in memory. The process of pre-fetching a cache line of data, decrementing the counter value by 1 and incrementing the address by 1 in the register is repeated. Eventually, the counter value will be equal to zero at which time a number of pre-fetches equal to the initial value of the counter value will have been initiated. When the counter value reaches zero, then the process terminates and no further pre-fetches are initiated until a new value is written to the register.

Figure 3:
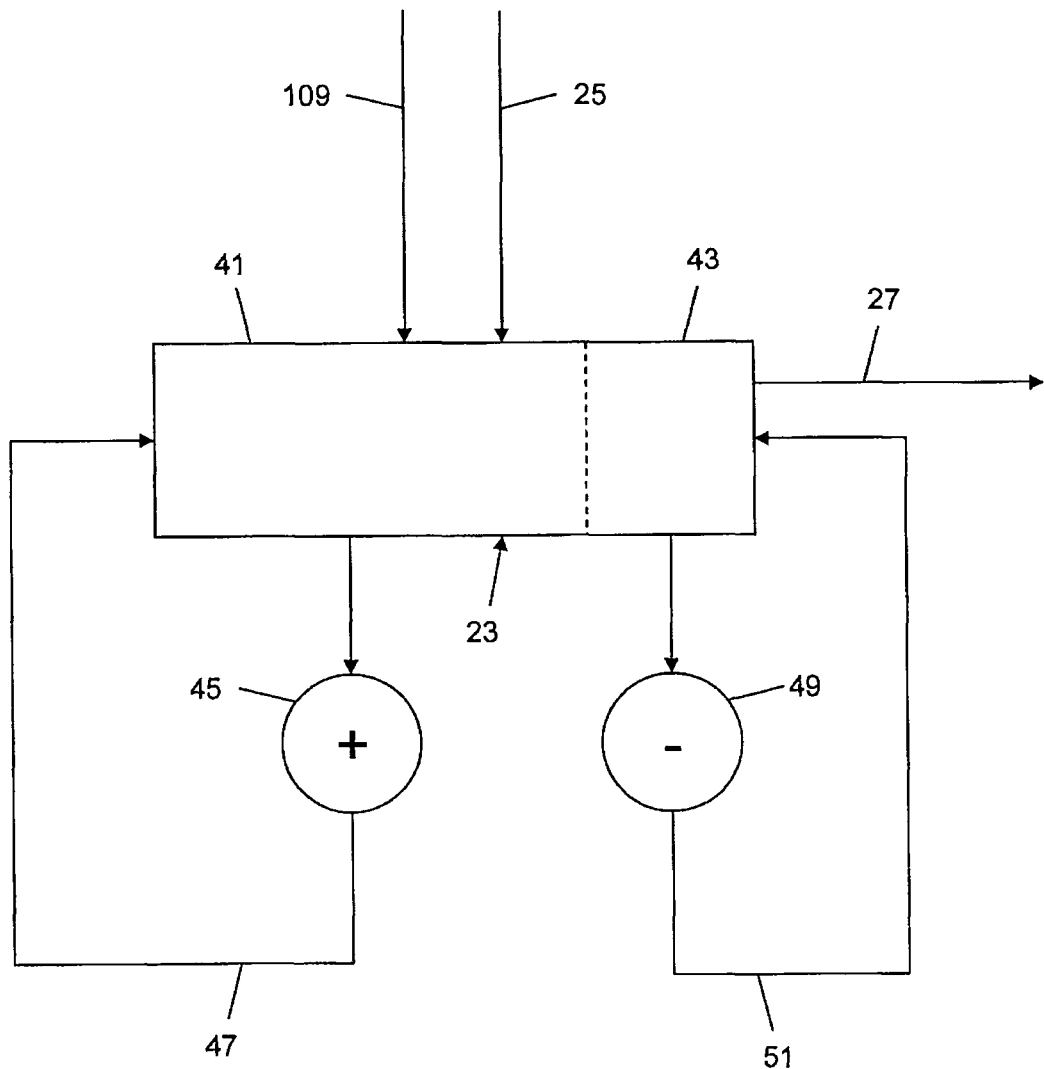
FIG. 3 is a schematic diagram of a register arrangement for use in the system illustrated in FIG. 1.

The above process may be implemented using the arrangement illustrated in FIG. 3. The register 23 has a first portion 41 corresponding to bits 31:5 and a second portion 43 corresponding to bits 4:0. A value is written to the register via line 25 or 109 and the written value may be transmitted to the tag memory via line 27. The register is arranged so that bits 31:5 of the written value may be transmitted to the first input of an adder 45. A second input of the adder receives a value of 1. The adder adds the two inputs producing an output on line 47 which is input back into bits 31:5 of the register. The register is also arranged so that bits 4:0 of the written value may be transmitted to the first input of an subtracter 49. A second input of the subtracter receives a value of 1. The subtracter subtracts the two inputs producing an output on line 51 which is input back into bits 4:0 of the register.

In an alternative embodiment, the lowest order bits of the value written to the register (bits 4:0 in the above example) do not represent the actual number of cache line sized portions of data to be pre-fetched. Instead, in this embodiment, the number of cache line sized portions of data to be pre-fetched is equal to two to the power of the number represented by the lowest order bits. For example, if bits 4:0 of the value written to the register represents the number 3 then $2^3=8$ cache line sized portions of data are pre-fetched, the first being located at the address represented by bits 31:5 of the value written to the register. Using this scheme, the pre-fetching of larger portions of data are supported without having to increase the number of bits used to specify the size of the portion of data to be pre-fetched.

In the examples described above, the counter value, referred to below as s, specified by the lowest order bits of the value written to the register may be regarded as defining the size of a region of memory containing data to be pre-fetched. In the first example, the size of the region of memory in units of the size of a cache line is equal to s, and in the second example, the size of the region of memory in units of the size of a cache line is equal to $2^s$. In each case the beginning of the region of memory is the address defined by the remaining highest order bits of the value written to the register (with any remaining bits required to define a complete memory address implicitly equal to zero). This address is referred to below as A.

In yet a further alternative embodiment, the value s (defined by the lowest order bits of the value written to the register) again defines the size of a region of memory containing data to be pre-fetched. However, rather than beginning with the address A (defined by the highest order bits of the written value), the region of memory is defined as follows. First, the size of the region of memory in units of the size of a cache line is equal to $2^s$. Second, the region of memory is aligned to a boundary equal to the size of the region of memory. Third, the region of memory contains the address A. It can be seen that these conditions mean that the region of memory not only contains the address A, but also a cache line sized region starting with the address A. This ensures that a cache line of data starting from the address A is included in the pre-fetch operation.

For example, if the value of s is 2 then the size of the region of memory is $2^2=4$ times the size of a cache line. If the size of a cache line is 32 bytes then the size of the region of memory in this case is 4×32=128 bytes. The region of memory is defined to be aligned to a boundary equal to the size of the region of memory. Therefore, in this example, the region of memory is one aligned to a 128 byte boundary. This means that the seven lowest order bits of the start address of the region of memory (in bytes) are equal to zero (since $2^7=128$). The specific 128 byte aligned address corresponding to the start address of the region of memory is defined by the condition that the region of memory contains the address A. This means that the start address of the region of memory is the 128 byte aligned address immediately preceding the address A.

The following assumes that a value 0xDEC0DE22 (in hexadecimal) is written to the register. In binary, the five lowest order bits (bits 4:0) of this value gives s=2. This specifies that $2^2=4$ cache line sized portions of data, or 128 bytes are to be pre-fetched. The address A represented by the remaining bits (bits 31:5) is 0xDEC0DE20. The 128 byte boundary immediately preceding the address A is 0xDEC0DE00 which is the start address of the region of memory. Therefore, a 128 byte portion of data, starting at the 128 byte aligned address 0xDEC0DE00, is pre-fetched. This pre-fetch may be performed, for example, by pre-fetching four 32 byte cache line sized portions of data from addresses 0xDEC0DE00, 0xDEC0DE20, 0xDEC0DE40 and 0xDEC0DE60. It can be seen that this includes a cache line of data starting at the address A.

In one embodiment, the pre-fetching of data is performed as a wrap-around process starting from the address A. Specifically, cache line sized portions of data are pre-fetched, the first from the address A and subsequently from addresses increasing each time by an amount equal to the size of a cache line. The nth such cache line to be pre-fetched would be done so from address A+32(n−1) in the case of 32 byte cache lines. However, when the address of the next cache line to be pre-fetched reaches a boundary equal to the size of the region of memory (indicating that the next cache line is outside the region of memory), then the address instead wraps around to the start address of the region of memory. In the above example, this would be the case when the next address reaches 0xDEC0DE80 which is on a 128 byte boundary. The process continues from the wrapped around address (which in the above example is 0xDEC0DE00) and terminates when all of the required data has been pre-fetched. It can be seen that the four 32 byte cache line sized portions of data are pre-fetched as before, but in the address order 0xDEC0DE20, 0xDEC0DE40, 0xDEC0DE60 and 0xDEC0DE00.

Using the arrangements described, pre-fetching of multiple cache lines of data may be initiated using a single data write operation. This allows a relatively large quantity of data, whose size can be selected, to be pre-fetched efficiently without requiring multiple write operations to be performed.

The skilled person would appreciate that various modifications to the arrangements described may be made. For example, it is understood that different numbers of bits of the value written to the register 23 may be used to define the address, A, and the counter value, s. In the embodiment described above, consecutive pre-fetches of multiple cache lines of data were made at increasing address locations. In an alternative embodiment, consecutive pre-fetches may be made at decreasing address locations. In this case, the adder 45 in the arrangement shown in FIG. 3 would be replaced by a subtracter. Any other appropriate pattern of address locations may also be used. In another variation, separate registers or memory locations may be provided to store the address and counter value. In this case, the addresses may or may not be aligned. In one embodiment, multiple pre-fetch registers 23 may be provided which may be individually accessed.

One exemplary use of the techniques described above will now be described. When data is transferred from an I/O interface to main memory, by a DMA engine for example, a CPU may be required to perform some computation on the data. For example, the I/O interface may be an Ethernet port, USB port or a SATA disk interface and the main memory may be a system DRAM. Upon completion of the data transfer, the DMA engine sends an interrupt to the CPU to signal that the data transfer has finished. The interrupt handler in the CPU then schedules the execution of an appropriate routine to deal with the computation to be performed on the data.

This process may be extended so that the DMA engine additionally writes one or more values to the register 23 causing some or all of the transferred data to be pre-fetched into the cache 1. For example, a single value may be written to the register 23, the value comprising the address of the first byte of transferred data (in bits 31:5) and the number, n, of cache line sized portions of data to be pre-fetched (in bits 4:0). This causes a selected volume of the transferred data to be pre-fetched into the cache. Alternatively, the process may be performed by sequentially writing n values to the register, each value written causing a single cache line sized portion of the transferred data to be pre-fetched into the cache. By performing these additional data writes, the transferred data will be located in the cache before the computation routine acting on the data is executed. Since data in the cache can be accessed more quickly than data in the main memory, this expedites the routine.

In an alternative method, once the data transfer is complete and an interrupt has been sent to the CPU, the interrupt handler may be arranged to write appropriate values to the register to cause some or all of the transferred data to be pre-fetched into the cache prior to the execution of the computation routine acting on the data.

A further embodiment will now be described with reference to FIGS. 4 to 8. In broad terms, in this embodiment there is provided a cache memory comprising storage means and a register, wherein the cache memory is arranged to fetch data from an address of an external memory device responsive to a value comprising the address being written to the register, and store the data in the storage means.

As mentioned above, a disadvantage of known systems is that they require the use of one or more special instructions to pre-fetch data into an L1 cache. Standard names for these instructions are pre-fetch, preload or touch instructions. It is commonplace to extend this functionality to L2 caches so that the aforementioned instructions can effect a similar operation on an attached L2 cache. This is an example of encoding the operation in the op-code of the instruction. In such cases the L1 & L2 cache normally communicate via a special interface which allows the L2 to perform actions when a special instruction is executed by the CPU. The further embodiment addresses this disadvantage, and thus does not use any special instructions to effect a pre-fetch operation.

In the second embodiment, the level 2 (L2) cache has a target port dedicated to accessing a special register called an L2PFR (L2 pre-fetch register). The use of this register allows CPU and non-CPU requesters to cause data to be fetched into the L2 cache before it is used, therefore avoiding having to suffer the delay incurred when the CPU fetches on demand.

The L2PFR may be implemented as a 32-bit write-only register. Writing a 32-bit value to this register may cause the naturally-aligned 32-byte block—whose address is specified by bits [31:5] of the value—to be fetched into the L2 cache. The pre-fetch operation can therefore be initiated by a CPU with a standard word write operation.

The procedure followed is that first the address is looked up in the L2 cache. If there is a hit, that is the 32-byte block associated with the address is present in the cache, then there is no further activity and no data is fetched. If there is a miss, which implies that the data is not in the cache then space is allocated in the cache and the 32-byte block is fetched from main memory and placed in the level 2 cache. This pre-fetch mechanism is therefore simple to use within the structure of conventional software and conventional DMA engines.

A common use is when a data buffer is to be transferred from an I/O interface to main memory whereupon the CPU will perform some computation on the data contained in the buffer. In a conventional system a DMA engine maybe deployed to transfer data from an I/O interface (e.g. an Ethernet port, a USB port, a SATA disk interface etc.) into system dynamic random access memory (DRAM). Upon completion of the data transfer the DMA engine would send an interrupt to the CPU to signal that the data is transfer has finished. The interrupt handler in the CPU would schedule the execution of an appropriate routine to deal with the computation to be performed on the data buffer.

The routine may then execute in an expedited manner by using one of two methods:

1). A linked list which specifies the set of transfers to be performed by the DMA is extended by one or more additional items. The first additional item specifies that a single 32-bit datum is to be transferred from system memory to the address of the L2PFR register. The value of the datum is the address of the first byte of the data buffer which has been transferred. Optionally, subsequent additional items are similar except that the value of the datum transferred to the L2PFR register is numerically 32 larger than the previous item. If n additional items were specified (where 1≤n≤(buffer size/32)) then this has the effect of pre-fetching some or all of the data buffer into the L2 cache.

2). The transfer proceeds as in a conventional system and an interrupt is sent to the CPU on completion of the DMA. In addition to the conventional actions the interrupt handler writes the address of one or more blocks which contain the data buffer to the L2PFR register. This causes some or all of the data buffer to be requested to be pre-fetched into the L2 cache before the computation routine associated with the data buffer is executed.

Figure 4:
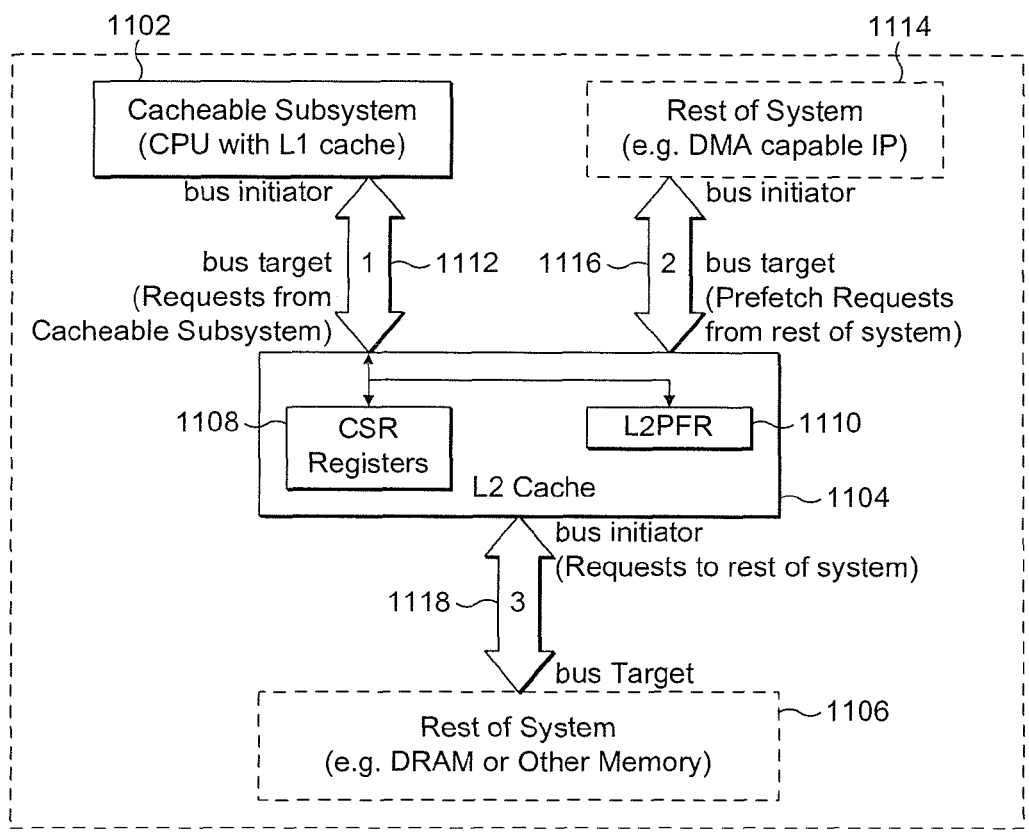
FIG. 4 shows a system topology comprising a level 2 cache for a further embodiment.

Reference is now made to FIG. 4, which illustrates a hierarchical memory arrangement. In this arrangement a CPU 1102 (which optionally has a level 1 cache) is supplemented by a separate module known as a level 2 cache 1104. Use of the term level 2 should not be taken to imply exclusive use in systems which have level 1 caches. Nor is there an implication that there is no level 3 or higher level caches. Nonetheless, the level 2 terminology is retained purely for simplicity of exposition.

The level 2 cache (L2 cache) 1104 is functionally located between the CPU 1102 and the rest of the system 1106 so that all of its high performance memory requests have to go via the L2 cache 1104. The L2 cache 1104 is able to service some of its requests from its own contents and other requests is passes on to the rest of the system to be serviced. The L2 cache 1104 also contains a number of configuration and status registers (CSRs) 1108 through which the operation of the L2 cache 1104 may be controlled and monitored.

Figure 5:
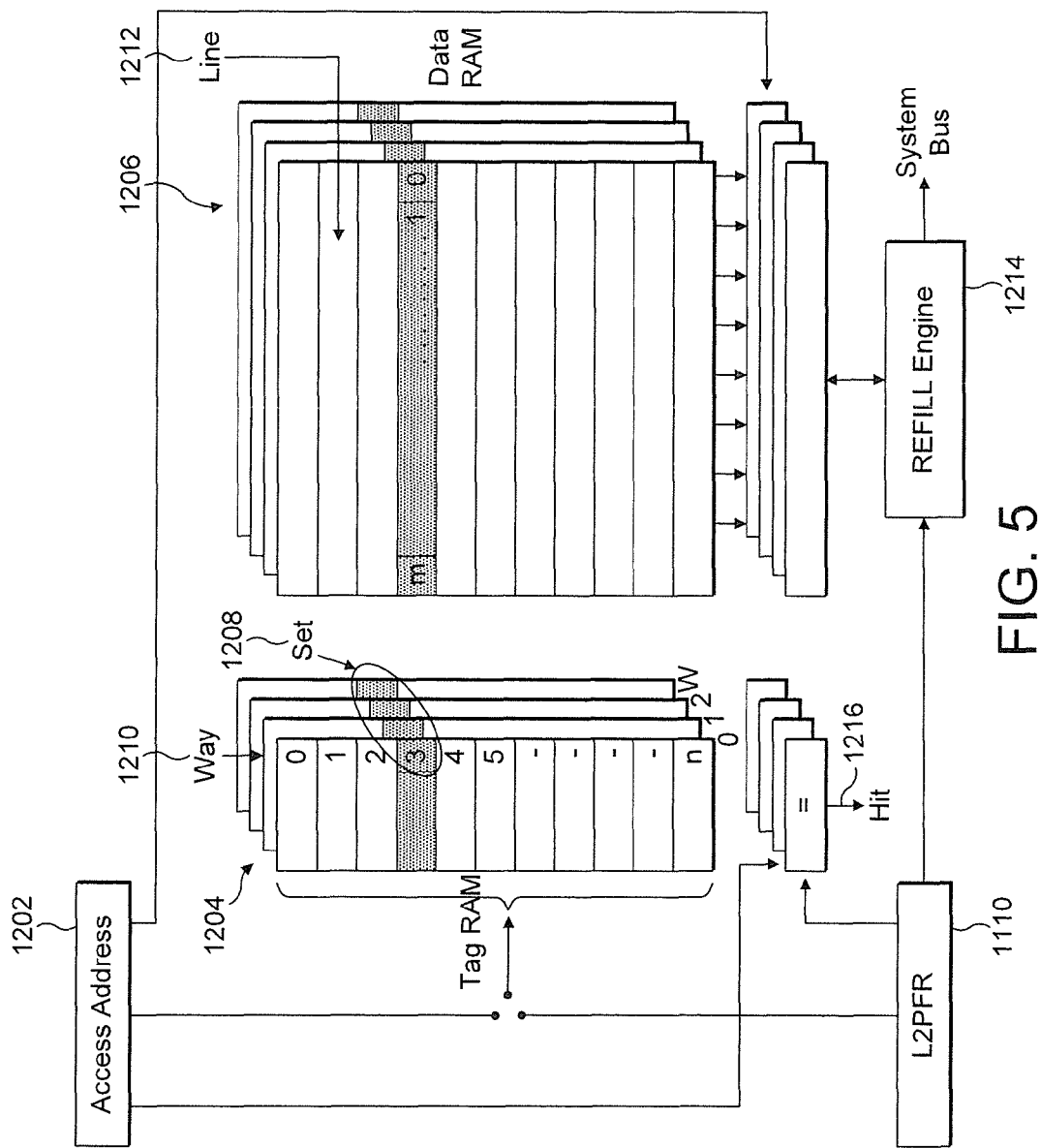
FIG. 5 shows the internal structure of a level 2 cache for the further embodiment.

A top-level diagram of a cache such as the L2 cache 1104 is shown in FIG. 5. The cache comprises an access address 1202, which is the address which is presented by the CPU 1102 to the L2 cache 1104, and a tag RAM 1204 which is the memory to which the access address 1202 is associated. In other words the access address 1202 is compared with the contents of the tag RAM 1204 to determine which data RAM 1206 array (line) should be selected. Data RAM 1206 holds the data which is supplied to the L2 cache 1104. In a set-associative cache an address can only reside in a limited number of places in the cache. The collection of places which a single address may reside is called a set 1208. The collection of addresses which are in the same set is called a way 1210. A block of data associated with a single address in the tag RAM 1204 is a line 1212. A refill engine 1214 is present, which is a functional unit whose responsibility is fetching from main memory data which is not already held in the cache. It does this on demand from a standard access or a pre-fetch.

Figure 7:
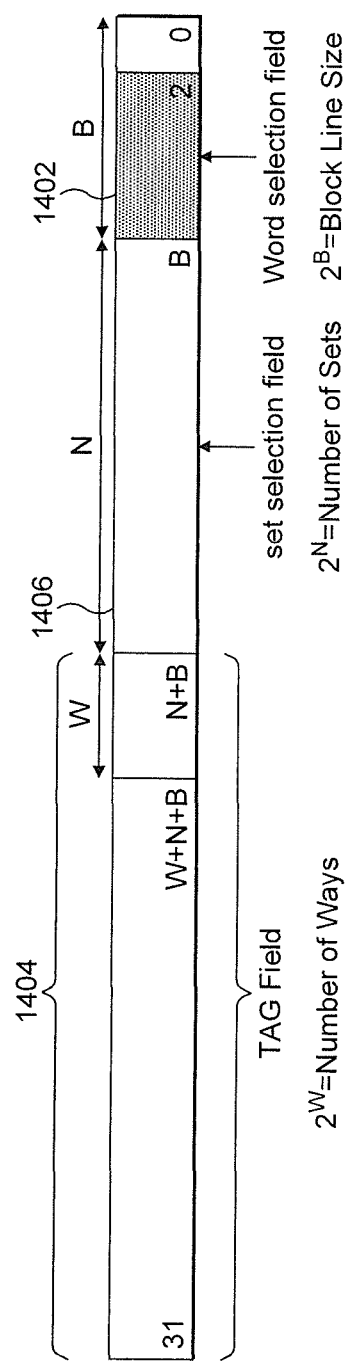
FIG. 7 shows the fields of a 32-bit physical address and how they are interpreted by the L2 cache lookup logic.

As mentioned, this embodiment makes use of a special register called L2PFR 1110, which is an operational register used to initiate a pre-fetch. The L2PFR 1110 is writable by both the CPU 1102 (using the target 1 port 1112) and modules with DMA capability 1114 in the rest of the system (using the target 2 port 1116). When the register is written with a 32-bit operand, the operand is interpreted as a cache line address (see FIG. 7). When an address is submitted to the cache for lookup the address is broken down into a number of fields that are used for different purposes by the hardware. The size and location of each of the fields depends on the size and internal organisation of the cache. An example arrangement of the fields is shown in FIG. 7. A word selection field 1402 specifies which of the 8 4-byte words in the line is the requested word. A tag field 1404 is stored in the tag RAM to uniquely identify the address of the data held in the associated line. A set selection field 1406 is used to determine which set in the cache is looked up.

Figure 6:
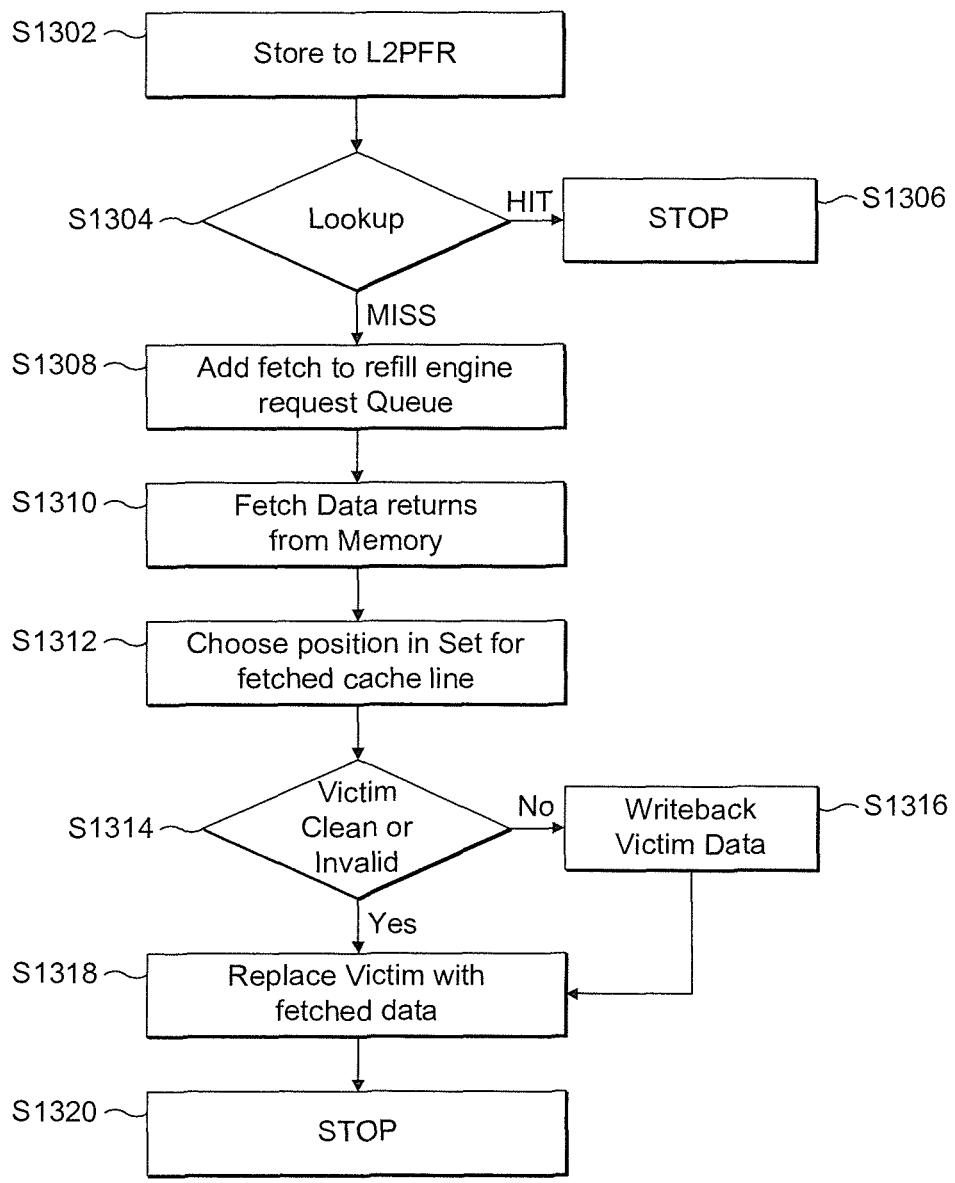
FIG. 6 shows a flow diagram for a pre-fetch procedure.
Figure 8:
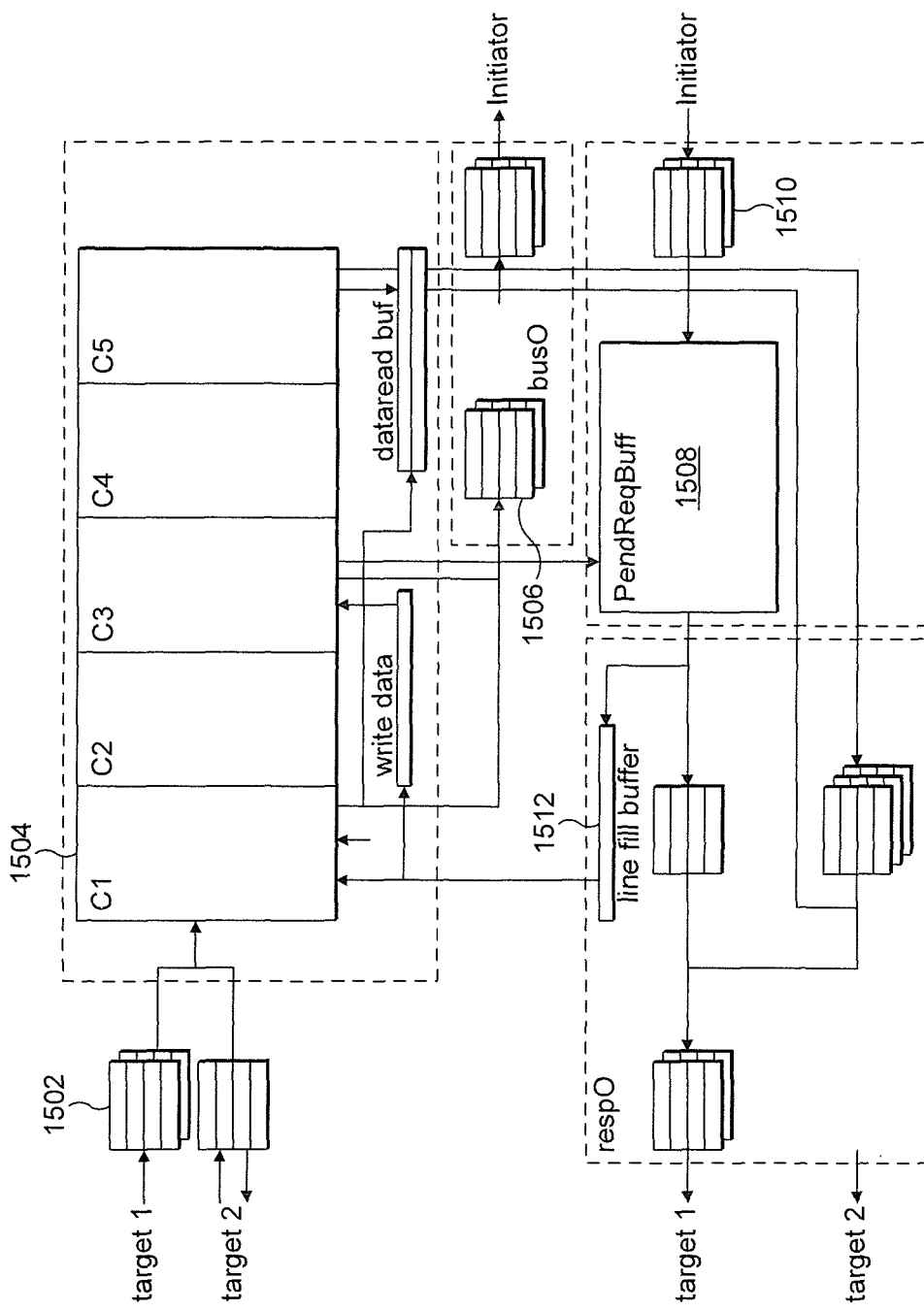
FIG. 8 shows internal buffering and logic for a level 2 cache.

The procedure following a write to the L2PFR 108 is outlined in the flow diagram in FIG. 6, with further reference to FIG. 8 which illustrates internal logic and buffering of the L2 cache. A write is made into the L2PFR in step S1302. This is interpreted as a request to fetch the address into the L2 cache. The operand is latched into the target 2 incoming buffer (1502 in FIG. 8) and transferred to the first part of the control pipeline C1 (1504) whereupon logic signals are generated such that the address is looked-up in the tags (see 1204 of FIG. 5).

A lookup of the L2PFR is made in step S1304. If the lookup of the L2PFR address does yields a match (in step S1306), as indicated by assertion of the "HIT" signal (1216 in FIG. 5) then this indicates that the data is already held in the cache and no further action is taken.

If the lookup of the L2PFR address does not yield a match this is indicated by de-assertion of the HIT signal (1216 in FIG. 5). In this case a fetch request is passed to the refill engine (1214 in FIG. 5) in step S1308. The refill engine ensures that an appropriate entry is added to the bus queue (1506) and also to the Pending request buffer (1508). The Pending request buffer holds address and allocation attributes of all outstanding requests.

Entries in the bus queue (1506) will eventually be realized as memory requests on the system interconnect (1118 in FIG. 4) in a standard manner. The request will eventually illicit a response containing the requested data in step S1310. The requested data is buffered in the response queue (1510). The request attributes contained in the pending request buffer (1508) are used to identify where in the cache the pre-fetched data is to be located and the tag which is to accompany it into the cache (step S1312). The data and tags are loaded into the cache using the line fill buffer (1512).

If the L2 cache is operated in copy-back mode there is a possibility that the place selected for the fetched data was previously occupied by a cache line (the victim) which has been modified since being fetched from memory (i.e. is termed dirty). A dirty victim will require writing back to memory—a process sometimes referred to as eviction. In step S1314 it is checked whether the write-back is needed, and if so, in step S1316 the L2 arranges for the write-back in a manner common to the design of caches and utilizing a write-back buffer to hold the data whose place in the cache will have been taken by the pre-fetched data. In step S1318 the victim is replaced by the fetched data, and, in step S1320, the process halts.

There is also the possibility that the data to be pre-fetched, although not currently present in the cache, is in the process of being fetched into the cache by a preceding data access miss or indeed an earlier pre-fetch. For this reason, in addition to looking up in the TAG array of the cache the pre-fetch address must also search the pending request buffer 1508. If there is a match in the pending request buffer then the pre-fetch request is discarded and no further action is taken.

Data access misses to the L2PFR address which occur when the pre-fetch request is pending will be detected by searching the pending request buffer. The Pending request buffer is able to link together subsequent data accesses, so that when the fetched data returns it is able to be used to satisfy each of these accesses in turn. This functionality is easily implemented in standard logic and is known to the designers of caches which are able to deal with multiple misses.

An enhancement to the first embodiment described above can be achieved though the use of "jumbo pre-fetch". In this case, low-order bits in the L2PFR are used to specify the number of cache lines to be fetched. In the preceding description it should be appreciated that the low order bits are not required to specify the cache line to be fetched as they normally indicate the byte-in-line to be accessed. This is extended to allow multiple cache lines to be fetched efficiently.

This can be performed by a decrement and fetch system. In this encoding all accesses to a dedicated jumbo pre-fetch register (denoted L2PFR_J) are interpreted as in Table 1 below, where bits [4:0] function as a simple count of the cache lines remaining to be fetched, or as in Table 2 below, where bits [4:0] function as power of 2 count of the lines to be fetched. On each L2 cache clock cycle the following procedure happens.

If L2PFR_J bits [4:0] are not zero, a pre-fetch request is issued to the line specified by L2PFR_J bits [31:5]—this occurs in the manner described previously for simple L2PFR register writes. Following the pre-fetch, L2PFR_J [4:0] is decremented by 1 and L2PFR_J [31:5] is incremented by 1. In this way a sequence of pre-fetches can be implemented with a single write to the L2PFR_J.

This logic may be implemented by an additional two adders and a comparator with simple modification to the L2 cache state machine in a manner known to all skilled logic designers.

TABLE 1

| L2PFR [4:0] | Lines Fetched | Bytes fetched |
|---|---|---|
| 00000 | 0 | 0 |
| 00001 | 1 | 32 |
| 00010 | 2 | 64 |
| 00011 | 3 | 96 |
| ... | ... | ... |
| 11111 | 31 | 992 |

TABLE 2

| L2PFR[4:0] | Lines Fetched | Bytes fetched |
|---|---|---|
| 0000 | 1 | 32 |
| 0001 | 2 | 64 |
| 0010 | 4 | 128 |
| 0011 | 8 | 256 |
| 0100 | 16 | 512 |
| 0101 | 32 | 1024 |
| 0110-1111 | Reserved | — |

It is understood that the features of any of the embodiment described above may be used in any of the other embodiments, where this is possible and appropriate. For example, the address fields illustrated in FIG. 7 may be used in the embodiment shown in FIG. 1.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for caching data, comprising:
a cache memory within a cache, the cache memory configured to store a copy of one or more portions of data stored in a system memory;
a cache load circuit within the cache, the cache load circuit configured to retrieve portions of data from the system memory and to store a copy of the retrieved portions of data in the cache memory;
a pre-fetch register within the cache, the pre-fetch register configured to be accessed by the cache load circuit and to store a value written to the pre-fetch register by any of multiple modules external to the cache, wherein the external modules include at least a processor; and
a monitoring component within the cache, the monitoring component configured to determine when a value has been written to the pre-fetch register and to signal the cache load circuit when a value has been written to the pre-fetch register,
wherein the cache load circuit is configured, in response to the monitoring component determining that a value has been written to the pre-fetch register,
to access the value written to the pre-fetch register and to retrieve a portion of the data stored in the system memory having a predetermined size and located at one of a memory address based on the written value and a cache line boundary memory address based on p most significant bits of the written value, wherein bits of the cache line boundary memory address other than those based on the p most significant bits of the written value are zero, and
to store the retrieved portion of data in the cache memory.

2. A system for caching data, comprising:
a cache memory within a cache, the cache memory configured to store a copy of one or more portions of data stored in a system memory;
a cache load circuit within the cache, the cache load circuit configured to retrieve portions of data from the system memory and to store a copy of the retrieved portions of data in the cache memory;
a pre-fetch memory within the cache, the pre-fetch memory configured to be accessed by the cache load circuit and to store a value written to the pre-fetch memory by any of multiple modules external to the cache, wherein the external modules include at least a processor; and
a monitoring component within the cache, the monitoring component configured to determine when a value has been written to the pre-fetch memory and to signal the cache load circuit when a value has been written to the pre-fetch memory,
wherein the cache load circuit is configured, in response to the monitoring component determining that a value has been written to the pre-fetch memory, to access the value written to the pre-fetch memory and to retrieve a portion of the data stored in the system memory at a memory address based on p most significant bits of the written value, and to store the retrieved portion of data in the cache memory,
wherein the memory address of the portion of data and the size of the portion of data are both defined by different portions of the value written to the pre-fetch memory, and
wherein the memory address is p+r bits in size, in which p bits of the value written to the pre-fetch memory define the p most significant bits of the memory address and in which the r least significant bits of the memory address are zero.

3. The system according to claim 2, wherein the size of the portion of data retrieved from the system memory and stored in the cache memory is specified by a portion of the written value.

4. The system according to claim 2, wherein the size of the portion of data is a number of cache lines corresponding to 2 to a power represented by a portion of the written value.

5. The system according to claim 2, wherein the memory address of the portion of data and the size of the portion of data are both defined by different portions of the value written to the pre-fetch memory.

6. The system according to claim 5, wherein the value written to the pre-fetch memory comprises p+q bits, in which p bits of the value define the p most significant bits of the memory address and q bits of the value represent a binary number used to determine the size of the portion of data.

7. The system according to claim 2, wherein the size of the portion of data is equal to a unit size of data.

8. The system according to claim 7, wherein the unit size of data is a cache line sized portion of data.

9. The system according to claim 7, wherein the system is configured to determine the memory address defined by the p bits of the value written to the pre-fetch memory,
and instruct the cache load circuit to retrieve a unit size of data from the memory address if the binary number is zero.

10. The system according to claim 2, wherein each of the modules is configured to write a value to the pre-fetch memory using a data write instruction.

11. The system according to claim 2, wherein the pre-fetch memory comprises a reserved or dedicated region of memory.

12. The system according to claim 2, wherein the pre-fetch memory comprises a register.

13. The system according to claim 2, wherein the pre-fetch memory is a write-only memory or a read-write memory.

14. The system according to claim 2, wherein access to the pre-fetch memory by the modules is selectively enabled and disabled.

15. The system according to claim 14, wherein the pre-fetch memory is accessible via two or more access ports, each access port configured to allow a respective set of one or more modules to write a value to the pre-fetch memory.

16. The system according to claim 15, wherein a first of the access ports allows access to the pre-fetch memory by one or more processors and a second of the access ports allows access to the pre-fetch memory by one or more modules having Direct Memory Access (DMA) capability.

17. The system according to claim 15, wherein access to the pre-fetch memory is controlled.

18. The system according to claim 17, wherein one or more of the access ports can be selectively blocked.

19. The system according to claim 2, wherein the monitoring component is selected from the group consisting of a hardware monitor, an autonomous monitor, and a dedicated monitor.

20. The system according to claim 2, wherein the monitoring component is configured to monitor when a value has been written to the pre-fetch memory by a write instruction.

21. The system according to claim 2, wherein the cache memory is part of a level 2 cache.

22. An integrated circuit comprising a system for caching data according to claim 2.

23. A system, comprising:
a processor;
a system memory; and
a cache configured to store a copy of one or more portions of data stored in the system memory, the cache functionally located between the processor and the system memory and including:
a cache memory configured to store the copy of one or more portions of data stored in the system memory,
a cache load circuit configured to retrieve portions of data from the system memory and to store a copy of the retrieved portions of data in the cache memory,
a pre-fetch memory configured to be accessed by the cache load circuit and to store a value written to the pre-fetch memory by any of multiple modules external to the cache including at least the processor, and
a monitoring component configured to determine when a value has been written to the pre-fetch memory and to signal the cache load circuit when a value has been written to the pre-fetch memory,
wherein the cache load circuit is configured, in response to the monitoring component determining that a value has been written to the pre-fetch memory, to access the value written to the pre-fetch memory and to retrieve a portion of the data stored in the system memory at a memory address based on the written value, and to store the retrieved portion of data in the cache memory,
wherein the memory address is p+r bits in size, in which p bits of the value written to the pre-fetch memory define the p most significant bits of the memory address and in which the r least significant bits of the memory address are non-zero.

24. The system according to claim 23, wherein the processor is configured to write the value to the pre-fetch memory of the cache memory system.

25. The system according to claim 23, further comprising:
a module with Direct Memory Access (DMA) capability, wherein the module with DMA capability is configured to write the value to the pre-fetch memory of the cache memory system.

26. The system according to claim 23, wherein the processor comprises a level 1 cache, and wherein the cache memory system forms a level 2 cache.

27. A method for pre-fetching data into a cache memory system including
a cache memory within a cache, the cache memory configured to store a copy of one or more portions of data stored in a system memory,
a cache load circuit within the cache, the cache load circuit configured to retrieve portions of data from the system memory and to store a copy of the retrieved portions of data in the cache memory,
a pre-fetch memory within the cache, the pre-fetch memory configured to be accessed by the cache load circuit and to store a value written to the pre-fetch memory by any of multiple modules external to the cache, wherein the external modules include at least a processor, and
a monitoring component within the cache, the monitoring component configured to determine when a value has been written to the pre-fetch memory and to signal the cache load circuit when a value has been written to the pre-fetch memory, the method comprising:
monitoring, with the monitoring component, when a value has been written to the pre-fetch memory; and
when the monitoring component determines that a value has been written to the pre-fetch memory, causing the cache load circuit to
access the value written to the pre-fetch memory,
determine a memory address based on the written value,
retrieve a portion of the data within the system memory at the memory address, and
store the retrieved portion of data in a cache memory
wherein the memory address of the portion of data is defined based upon the value written to the pre-fetch memory, and
wherein the memory address is p+r bits in size, in which p bits of the value written to the pre-fetch memory define the p most significant bits of the memory address and correspond to a cache line boundary memory address, and in which the r least significant bits of the memory address are treated as zero.

* * * * *